Jan. 7, 1969  R. G. BEACH  3,420,147
LEVER DEVICE

Filed July 20, 1966

INVENTOR
Richard G. Beach

United States Patent Office 3,420,147
Patented Jan. 7, 1969

3,420,147
LEVER DEVICE
Richard G. Beach, Greece, N.Y., assignor to Taylor Instrument Companies, Rochester, N.Y., a corporation of New York
Filed July 20, 1966, Ser. No. 566,613
U.S. Cl. 92—37          14 Claims
Int. Cl. F01b *9/04;* F16j *3/00;* F15b *5/00*

ABSTRACT OF THE DISCLOSURE

A lever is fixed to a base by a stiff wire and several bellows, which tilt the lever about axes intersecting at the wire. The bellows are fixed to the base by eccentric mountings rotatable to shift the base ends of the bellows transverse to the direction of thrust of the bellows and of the wire's length. Such shift also shifts the location of the centers of bellows thrust both transversely and along the corresponding lever arms. The ends of the wire are fixed above the lever and below the base, in effect, so that the free length of wire is considerably larger than the spacing between base and lever.

---

This invention relates to mechanisms such as devices including a lever and pressure responsive means for moving said lever. Mechanisms of this type find use in pneumatic controllers and other pressure-operated relay devices, such as those disclosed in U.S. Letters Patent No. 3,047,002 of Howard R. Jaquith, entitled, "Controller," granted July 31, 1962 and assigned to the assignee of the present invention.

In particular, the present invention relates to adjusting the center of thrust of pressure responsive means such as bellows. For present purposes, a bellows is a cylinder, circular in cross-section which expands and contracts in the direction of its axis (i.e., its geometrical axis) in response to change in pressure therein. Such expansibility and contractibility is obtained by the usual corrugations, hence, if one end of the bellows is fixed, the other end can be displaced or tilted by application of force thereto transverse to the bellows axis. Save for these two types of deformation, the bellows configuration is unchanging, insofar as the purposes of the present invention are concerned.

Ideally, the center of thrust of the bellows is its axis, and it is sought to closely approximate the ideal by constructing the bellows with radial symmetry with respect to its axis. In the ideal case, if sufficient force be applied to the bellows end at a point on the said axis and in the direction thereof, changing the bellows pressure should not cause movement of the bellows end for the reason that the sum of moments of the forces due pressure on the bellows end is zero at said point. In a real bellows, however, it is unavoidable that the point of zero sum is offset from the bellows axis, hence, the real bellows' end will tilt if subjected to the operation described for the ideal case. In short, the center of thrust of the real bellows is a straight line spaced from the axis of the bellows and approximately parallel thereto.

Moreover, when the bellows is used to deflect a lever, whose effective lever arm may, for the moment, supposed to be known exactly, the bellows must be positioned so that its center of thrust is applied to the end of that lever arm. Again, supposing the deflection of the lever is to be about a known, fixed axis, the bellows must also be located so that its center of thrust is directed normal to said axis. Also, in mechanisms such as the relays disclosed in the aforesaid Jaquith patent, there is a normal or zero position of the effective lever arm where the center of thrust is supposed to be normal to the lever arm.

Finally, where the bellows' thrust is controlled by the elastic force exerted by means such as additional bellows, springs, and/or other such entities acting on the lever, it is evident that the mechanism contains a number of thrust centers that must be properly located in order to obtain performance of the mechanism in accordance with its design on paper.

In accordance with the present invention, the bellows' center of thrust is adjusted by fixing the bellows at one end to the lever, and moving the other end laterally of the bellows' axis. The operative parts of the mechanism are fixed to rigid structure, such as a common base, as usual, but attachment of said one end to such base is by means of a fitting also providing communication between the interior of the bellows and a source of fluid pressure for operating said bellows. The fitting is constructed to be rotatable on an axis fixed with respect to said base and directed more or less along the bellows' axis, and spaced therefrom. The fitting, in turn, rotatably mounts the bellows so that if the fitting is rotated, the bellows axis is rotated at its lower end bodily about the fitting axis, whereas its upper end remains fixed. The bellows' axis is therefore bent and rotation makes it describe a roughly conical surface (the surface, of course, is slightly concave outward from apex to base). This has the effect of tilting the center of thrust of the bellows and of rotating it bodily about its ideal location.

From the foregoing, it will be seen that the particular object of the invention is to provide a bellows and lever mechanism having novel means for adjusting the center of thrust of the bellows. Other objects will become evident upon persual of the description to follow and the appended claims.

Figure 1:
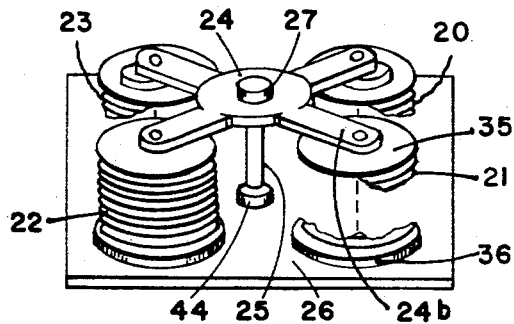
FIGURE 1 is a perspective view of a specific device embodying the invention.
Figure 5:
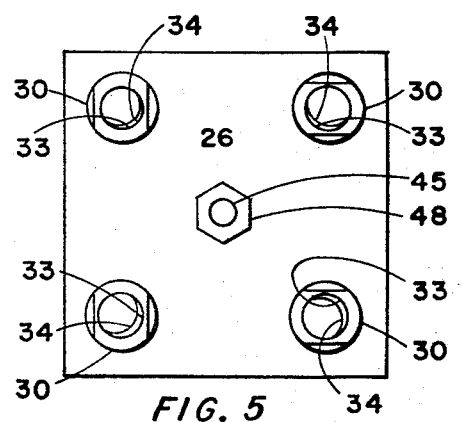
FIGURE 5 is a plan view of the bottom of the device of FIGURE 1.

In FIGURE 1, a set of bellows 20, 21, 22 and 23 is connected to a plate 24. A wire 25 connects the plate 24 to a base 26 which also mounts the said bellows. This arrangement, in essence, is as described and claimed in the Jaquith patent, wherein wire 25 provides a sort of universal hinge which allows each bellows to tilt the plate about various axes which, in effect, pass through a common point which may be supposed to be at the connection of wire 25 and plate 24 and fixed in space. Naturally, as most of the length of wire 25 bends when the plate 24 is tilted, said connection and the plate shift about. However, the functional relation of bellows, plate, and wire may be treated as if there is such fixed common point, without significant error resulting in practice.

In the present case, wire 25 is relatively stiff, being in a typical case a right cylindrical rod of hard drawn stainless steel about ⅛″ in diameter and two inches long, with about ⅛″ of each end rigidly fixed to plate 24 and base 26, respectively. Preferably, its stiffness is such that its resistance to plate tilting is rather greater than that of the bellows 20, 21, 22 and 23 together.

It will be evident that the angular orientation of plate 24 with respect to base 26 is a function of the fluid pressures reigning inside and outside the bellows, the outside pressure being usually the same for each bellows (commonly atmospheric pressure which, of course, varies from time to time, but in this case not significantly insofar as the bellows are concerned).

Ideally, the wire 25 would be absolutely straight when each bellows has the same magnitude of pressure therein as its fellows. This assumes, however, that the moment of force of each bellows is also the same as that of each of its fellows, a condition which may be closely approximated by making the bellows as nearly identical as possible in stiffness, effective area and dimensions and by positioning them so that the lever arms by which the bellows tilt the plates 24 as nearly identical as possible (as measured from some point of plate 24 on the center line of wire 25 to the points of application of bellows forces to the plate).

Figure 6:
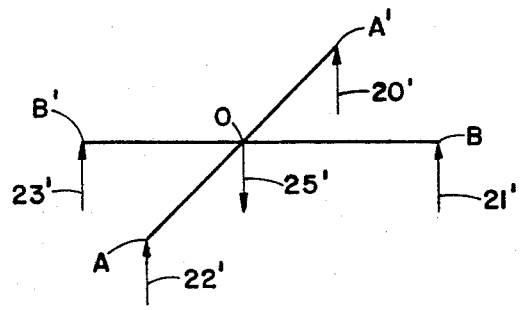
FIGURE 6 is a diagram illustrating the principles of the invention.

FIGURE 6 illustrates the ideal condition. There, reference numerals 20', 21', 22' and 23' represent the centers of thrust of the correspondingly-numbered bellows. Axes AA' and BB' (corresponding to the like-designated axes in FIGURE 1 of the Jaquith patent) are normal to one another and define the respective effective lever arms of the plate 24. These lever arms are OA', OA, OB, and OB' and each is equal in length to the other. Reference numeral 25' is the center of thrust of plate 24. All centers of thrust are along lines parallel to each other and normal to the plane defined by axes AA' and BB'. Assuming that the thrusts of the bellows are all alike and that the thrust of the wire 25 is equal to their sum, the plate 24 will not change position if all the bellows thrusts change by equal amounts and in the same sense.

In practice, the illustrated symmetry of orientation of centers of thrust and of axes, and equality of lever arm lengths are only approximated. Moreover, the bellows' effective areas and resistance to expansion will differ. Thus, if a set of bellows, a wire 25, a plate 24 and a base 26 are assembled in such orientations to each other that their geometry, in appearance (as in FIGURE 1 hereof), seems to establish the scheme shown in FIGURE 6, in reality, that is not usually the case. For example, if bellows 21 is located so that its axis is in the position of center of thrust 21', its actual center of thrust is likely to be elsewhere. Again, what appears to be lever arm AO of arm 24b, i.e., the distance from the axis of wire 25 to the axis of bellows 22' ordinarily is not. In short, in a real device, if the fluid pressure in one or more of the four bellows changes, plate 24 will tilt in an amount and/or about an axis that differs from that which would be expected from the ideal scheme depicted in FIGURE 6. Specifically, if the pressures in the bellows are all equal (and each bellows is subject to the same substantially constant external pressure, usually atmospheric pressure), and then each internal bellows pressure changes by the same amount and in the same sense, plate 24 will tilt in an amount that is a measure of said pressure change. In the ideal case, the plate would not move, of course.

In practice, it is therefore necessary to provide for adjusting thrust centers in such a way that the real device behaves as nearly as desired as if it were ideal. According to the present invention, the desired adjustment is provided at the end of the bellows fixed to the base 26 in the form of means for establishing the bellows' base-end at different positions on the base shifted laterally of the center of thrust of the bellows, the other end of the bellows remaining fixed to the plate 24. Such adjustment warps the geometrical axis of the bellows and shifts the center of thrust laterally.

While base-end adjustment has the seeming disadvantages that it involves the bellows pressure connection (normally at the base-end), and that the balance of moments on plate 24 is extremely sensitive to change in base-end position (as compared to adjusting in corresponding fashion, the point of attachment of the other end of the bellows to plate 24), I obtain base-end adjustment by a simple modification of the aforesaid pressure connection, that allows the adjustment effect to be applied in minute, precisely-regulatable amounts.

Figure 4:
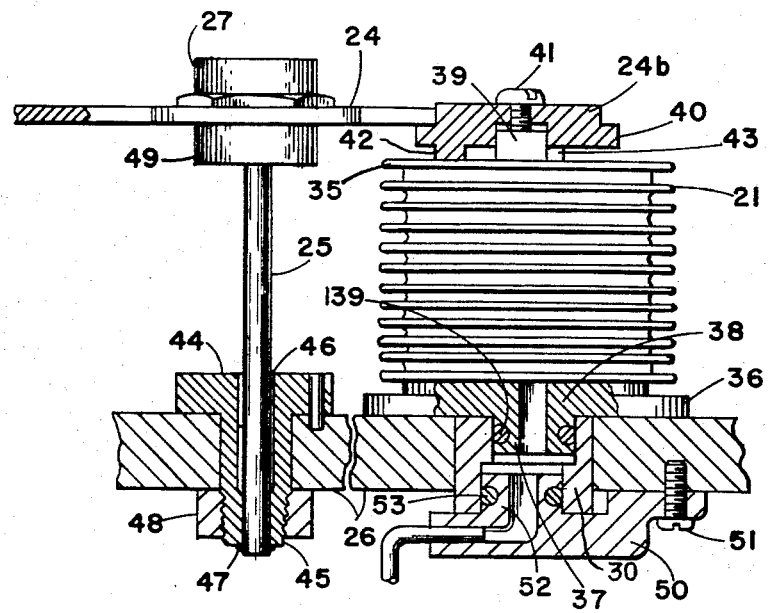
FIGURE 4 is a mainly sectional, and partly fragmentary, view of the device of FIGURE 1 showing various details not apparent from FIGURE 2.
Figure 2:
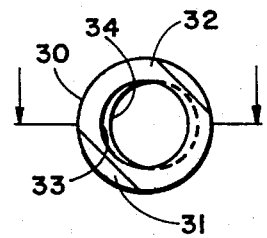
FIGURES 2 and 3 are, respectively, a plan view and an elevation of a bellows fitting according to the invention.
Figure 3:
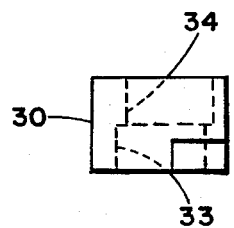

In FIGURES 2 and 3, such pressure connection is essentially in the form of a fitting 30, right-cylindrical in form except for a pair of flats 31 and 32 at one end thereof, and having right-cylindrical bores 33 and 34. The axis of bore 33 is the axis of the fitting 30, whereas the axis of bore 34 is parallel to and spaced from the axis of the fitting 30. As FIGURE 4 indicates, fitting 30 is received in base 26, being fitted into a hole therethrough fitting the fitting 30 substantially without play, but allowing it to be rotated on its axis as by a wrench applied to flats 31 and 32. Such rotation will cause the axis of bore 34 to describe a cylindrical surface whose axis is the axis of the fitting 30. Bellows 21, which is closed at one end by a rigid plate 35 and at the other end by a rigid plate 36, has a nipple 37 projecting from plate 36 into bore 34. Plate 36 lies flat on the surface of base 26, and the nipple 37 is cylindrical in form and has a bore 38 communicating with the interior of bellows 21. Nipple 37 fits snugly, but rotatably, in bore 38 and is provided with an O-ring 139 in a suitable circumferential groove of the nipple which seals the interstice between nipple 37 and bore 34. The axis of nipple 37 is the axis of bore 34 and, preferably, of bellows 21 (in its undistorted form).

The plate 35 of bellows 21 has a stud 39 projecting therefrom into a pad 40 on the arm 24b of plate 24, suitable means such as a screw 41 clamping together arm 24b, stud 39 and pad 40. Preferably, pad 40 has three legs, such as indicated at 42 and 43 to provide a three-point contact with plate 35, stud 39 being not quite long enough to bottom in pad when screw 41 draws the plate 35 tightly to the pad legs.

The construction described effectively fixes the ends of bellows 21 rigidly to plate 24 and base 26, respectively. However, when fitting 30 is rotated, the plate 36 will be arcuately shifted parallel to the base 26. Wire 25, being relatively stiff, holds the plate 35 substantially immobile, and consequently, the shift of plate 36 also shifts the center of thrust of bellows 21 with respect to plate 24. As each bellows is mounted to base 26 and plate 24 like bellows 21, the centers of thrust of all bellows may be moved around to such orientations as to balance the moments of force on the plate when the same pressure reigns in each bellows. Though the actual change in bellows' base-end position is small, the movement of the end of the wrench or like tool used to turn fitting 30, is distributed over an arc several inches long, typically, so that the base-end position changes can be made in minute and precise increments corresponding to much larger increments of motion along said arc.

In a typical case, the perpendicular distance between wire 25 and the axis of bellows 21 is about an inch, and the axis of bore 34 is about $\frac{1}{32}''$ displaced from the axis of bore 33, so that the position of the bellows can be changed up to $\frac{1}{32}''$ in any direction, from the axis of rotation of fitting 30. In a controller such as depicted in FIGURE 3 of the Jaquith patent, this particular range of adjustment allows equalizing the moments to 0.01 p.s.i. over a range of from (3–15) pounds per square inch. That is, assuming the external pressure remains constant, and that the pressure in each bellows is 3.00 p.s.i., then changing the pressure in each bellows to 15.00 p.s.i. will not cause rod 27 to deflect more than would 0.01 p.s.i. change in the pressure of one bellows only. Actually, the balance of moments can be made ten times as fine as this by use of the adjustment according to the present invention.

In principle, any irregularity likely to be met in practice could be balanced out by suitably proportioning the fitings 30 (the amount of adjustment distance available is proportioned to the spacing between the axes of bores 33 and 34). However, in any given case, the material, dimensions, and configuration of the bellows convolutions will set a limit on how much it is permissible to distort the bellows by displacement of one end thereof transverse of the bellows axis, the other end thereof remaining fixed.

Accordingly, it is usually desirable to match bellows. From considerations of symmetry, it is evident that opposite bellows only need to be matched. That is, if the moment of bellows 21 balances the moment of bellows 23, it is generally sufficient, provided the moment of bellows 20 balances the moment of bellows 22. Bellows 20 and 22, however, do not have to match bellows 21 and 23.

For present purposes, bellows are matched when each exerts the same moment on the same effective lever arm and the center of thrust is located at the end of the said lever arm. Pairs of such bellows are then assembled as opposing bellows connected to a plate 24, with the centers of thrust located on the apparent effective lever arms of the plate, i.e., on the axis BB' (or AA') as determined from the geometry of the plate. The plate is constructed so that the center line of stud 39, the center of the corresponding stud (not shown) on the plate arm opposite arm 24b and the axis of the wire 25, are nominally coplanar, and axis BB' is in this plane and nominally normal to the said center lines. However, manufacturing tolerances result in variations of the location of the various lines and axes, and the match of the bellows obviously does not account therefor. Nevertheless, the possible extent of base-end change needed to balance the moments is decreased since it will not have to account for bellows difference. In any event, the bellows matching is a practical refinement, which, in many cases, can be dispensed with and which does not partake of the essence of the present invention.

The base-end adjustment has several distinguishable effects. In practice, it is as if turning the fitting 30 bodily displaces the center of thrust of the bellows 21 in orthogonal paths, one being normal to the plane which both contains axis AA' and is normal to axis BB', and the other being parallel to said plane (or in it, in some cases, or course). While each bellows is capable of such adjustments, preferably, one of each opposing pair of bellows has its fitting oriented with respect to the bellows such the 180° rotation of the fitting causes the one adjusting effect to predominate. For example, as shown in FIGURE 6, it is evident that if the fittings of bellows 20 and 23 (the lower pair of fittings) are turned 90° in either direction, the predominate bellows base-end position change is along the corresponding axis AA' or BB'. This adjustment provides an effective lever arm length change. On the other hand, with the upper fittings, which belong to bellows 21 and 22, bellows-end position change is predominantly normal to the corresponding axes. This adjustment provides for compensating for failure of the center of thrust of each pair of opposite bellows to be in the same plane as the center of thrust of the plate 24.

It is to be remarked that the referred to centers of thrust are inferential entities, the locations of which are not very precisely determinate, and the location changes of which are rather more complex than herein indicated. Moreover, the plate 24 integrates the various forces applied thereto and the various adjustments interact to some degree. However, as a practical matter, it is self evident that if both the bellows 21 and 23 are far enough to one side of the plane containing the axis of wire 25 and the bisector of arm 24b (and the bisector of its opposite fellow connected to bellows 23) that there will be a moment due to bellows 21 and 23 in proportion to the sum of the force exerted thereby, and this moment will tend to deflect the plate 24 about the axis BB', which is not desired of this pair of bellows. Again, if the base of bellows 23 is moved toward or away from wire 25, it is obvious that this will change the effective lever arm of bellows 23, and thereby effect the moment balance as between it and its opposite, bellows 21. Real devices, after manufacture, in general, may be expected to show these effects, but the adjustments according to the invention will compensate, correct or balance out such effects, to the extent desired, by changing bellows base-end positions in the opposite senses to the changes envisaged as producing the undesired effects. I therefore do not regard the explanation based on FIGURE 6 as limitative or essential to understanding the use and application of the invention, though insofar as I am aware, the said explanation is not incorrect.

Plates 24 and 26 are preferably parallel to one another and perpendicular to the axes of wire 25 and of the several bellows (except for the deviations of the bellows axes due to the adjustment of the fittings 30) when the moments on the plate are balanced, and the pressures identical in each bellows. For compactness, the distance between plates 24 and 26 is rather less than is desirable considering the stiffness of rod 25. Thus, if wire 25 were fixed at those portions thereof emerging from the adjacent surfaces of base 26 and plate 24, bending stress would concentrate to undesirable degree in the emergent portions of wire 25. In the present invention, this concentration is avoided by securing the wire's ends at points separated by substantially the entire mechanism shown in FIGURE 1.

Thus, the lower end of wire 25 is provided with a seat 44 extending through a hole in base 26 and terminating below said base in threaded portion 45. Wire 25 extends through an axial bore 46 in seat 44, said bore being somewhat larger in diameter than the wire, except in portion 45, at which place wire end and threaded portions are brazed together, as indicated at 47, to rigidly unite them. Seat 44 is drawn down on base 26 by a nut 48 on threaded portion 45. Thereby, the lower end is rigidly fixed to base 26. A like seat 49 is provided in plate 24, with wire 25 similarly arranged therein, so that it is also rigidly fixed at its other end to plate 24. It will be observed, however, that the length of wire 25 that can bend is about twice as long as the spacing between the plates would provide were the wires fixed to the plate and base at the point where it enters the general confines of plate and base. This arrangement is particularly advantageous in that it permits the wire ends to be fixed by brazing, which is not noted for its strength and resistance to mechanical fatigue, rather than by welding, the heat of which would produce undesirable annealing effects in the vicinity of the weld, whereas the lower heat of brazing does not.

In view of the disclosure of the previously cited Jaquith patent, supra, it is unnecessary to detail the use of the device of FIGURE 1, which may be characterized as a pressure summing lever device, whose output is a tilt of some element, say, part of the device, for instance, rod 27, which operates a suitable motion or position detecting device (not shown). Moreover, the invention may be advantageously applied to other than multibellows devices, as indeed is evident from FIGURE 4 hereof.

Further, it is evident that the nipple 37 could form an integral part of coupling 30 projecting into a hole through base 26, as it now does into the bore 34, this being but an interchange of parts which does not change the basic coupling and adjustment characteristics involved.

As shown (FIGURE 4), external coupling to the bellows is made by a connector 50, clamped to base 26 by suitable means such as a screw 51, and having a nipple 52 received by bore 33 and sealed therein by an O-ring 53 embracing the nipple 52. Nipple 52 could, of course, project from the fitting 30 and seat in the connector 50. A pipe or tube 54 leads to some external source of pressure involved in the operation of the device using the bellows. Suitable means (not shown) are provided to clamp the bellows base plate 36 to base 26, after proper adjustment of the bellows' based-end.

The O-ring and nipple coupling permit rotation of the coupling 30 with respect to bellows base plate 36 and connector 50, which is desirable, since screw 41 fixes plate 35 rigidly to the pad 40 and connector 50 is clamped to the base. However, both connector 50 and bellows 21 could be screw-coupled to the fitting, if loosening and freeing the connection of connector 50 to base 26 and plate 35 to pad 40 could be tolerated for purposes of adjusting the base-end of the bellows without torsionally stressing the bellows and/or unscrewing (or tightening) bellows and connector connection to the fitting.

I have described my invention as required by the statutes, and in such terms that a variety of uses and structural modifications of my invention will be manifest to those skilled in the art, and fall within the scope of the following claims, with reference to which the foregoing description is to be considered exemplary rather than limitative.

I claim:

1. A lever device including a lever, a base and pivot means pivoting said lever to said base; a bellows, means connecting one end of said bellows to said lever for deflecting said lever on said pivot means and means adjustably fixing the other end of said bellows to said base; the last said means comprising a member secured to said base for rotation about a first axis, said other end of said bellows being secured to said member with the bellows' axis lying alongside of said first axis but being spaced therefrom.

2. The lever device of claim 1, including further bellows, constructed and arranged like the first said bellows; each said bellows lying substantially equi-spaced from said pivot.

3. The lever device of claim 1, including three additional bellows, each constructed and arranged like the first said bellows, all said bellows being equi-spaced from said pivot, each said bellows being equi-spaced from the next; said pivot means providing for deflecting said lever about axes defined by pairs of alternate bellows.

4. The lever device of claim 1, wherein the said last said means includes a pressure connection for introducing pressure via said member into said bellows.

5. The lever device of claim 1, wherein said member is cylindrical and is received in a like hole in said base for rotation therein, one of said bellows and said member having a nipple extending therefrom into the other thereof.

6. The lever device of claim 5, wherein said member is a cylindrical fitting having a pair of interconnecting circular bores, one said bore rotatably receiving said nipple, said nipple extending from said other end of said bellows, and the axis of the last said bore being spaced from and lying alongside of the axis of the other bore.

7. The lever device of claim 1, wherein said pivot means is an elastic wire whose stiffness is large compared to said bellows, said wire being substantially parallel to the axis of said bellows.

8. The lever device of claim 7, wherein one end of said wire passes substantially through one of said lever and said base, the material of said one of said lever and said base being spaced from the said one end so as to permit said wire to bend without contacting said material, means located substantially on the other side of said one of said base and said lever from the other of said lever and said base; the last said means fixing said one end with respect to said one of lever and said base.

9. The lever device of claim 8, wherein the other end of said wire is arranged and fixed with respect to said other of said lever and said base in the same manner as said one end of said wire is arranged and fixed with respect to said one of said lever and said base.

10. A lever device including an elastic wire, a base and a lever, said base and said lever lying along one another and being spaced one from the other, said wire connecting said base and said lever for pivotally mounting the latter with respect to the former; one end of said wire passing through one of said lever and said base, the material of said one of said lever and said base being spaced from the said one end so as to permit said wire to bend without touching said material; means located on the other side of said one of said lever and said base from the other of said lever and said base, the last said means fixing said one end with respect to said one of said lever and said base.

11. The lever device of claim 10, wherein the other end of said wire is arranged and fixed with respect to said other of said lever and said base in the same manner as said one end of said wire is arranged and fixed with respect to said one of said lever and said base.

12. A differential device comprising in combination a base; parallel supporting means mounted at opposite parts of said base; bellows means including means at one end of each thereof connected to the respective supporting means such that each may be rotatably adjusted relative to the other; supporting means connecting the other ends of said bellows means to the ends of a lever for angular deflection of said lever in response to different pressures in said bellows means; and means forming part of said parallel supporting means for preventing angular deflection of said lever with respect to the axes of said supporting means when said bellows means move due to like pressure changes within said bellows means when the pressures within said bellows means are equal.

13. The differential device of claim 12, including eccentric means forming part of said bellows supporting means for preventing said angular deflection.

14. The differential device of claim 13, said eccentric means being mounted for rotational adjustment about the said axes, and said bellows means being mounted so that their axes extend alongside the former said axes.

References Cited

UNITED STATES PATENTS

| | | | |
|---|---|---|---|
| 1,425,412 | 8/1922 | Norwood | 92—40 X |
| 2,202,405 | 5/1940 | Smith | 287—20.2 X |
| 2,426,653 | 9/1947 | Whelan et al. | 287—20.2 X |
| 2,960,098 | 11/1960 | Watrous | 137—85 |
| 3,047,002 | 7/1962 | Jaquith | 137—85 |
| 3,354,722 | 11/1967 | Waite et al. | 92—39 X |

FOREIGN PATENTS 765,539  1/1957  Great Britain.

MARTIN P. SCHWADRON, *Primary Examiner.*

IRWIN C. COHEN, *Assistant Examiner.*

U.S. Cl. X.R.

74—108, 519; 92—40; 287—20.2; 137—85, 86